United States Patent [19]

Kumar et al.

[11] Patent Number: 5,548,478

[45] Date of Patent: Aug. 20, 1996

[54] PORTABLE COMPUTING DEVICE HAVING AN ADJUSTABLE HINGE

[75] Inventors: Rajendra Kumar, Akron; Steven E. Brooks, Canton, both of Ohio

[73] Assignee: Khyber Technologies Corporation, Fairlawn, Ohio

[21] Appl. No.: 280,092

[22] Filed: Jul. 25, 1994

[51] Int. Cl.$^6$ .............................. G06F 1/16; H05K 7/16; E05D 11/00

[52] U.S. Cl. ............................................. 361/681; 16/223

[58] Field of Search ........................ 364/708.1; 439/164, 439/165; 16/223, 365, 366, 378, 379; 361/679–683

[56] References Cited

U.S. PATENT DOCUMENTS

| | | | |
|---|---|---|---|
| D. 338,660 | 8/1993 | Youens et al. | D14/106 |
| D. 343,831 | 2/1994 | Spoeth | D14/106 |
| D. 343,832 | 2/1994 | Haraga et al. | D14/106 |
| 5,016,849 | 5/1991 | Wu | 248/183 |
| 5,041,965 | 8/1991 | Chen | 345/7 |
| 5,173,837 | 12/1992 | Blackwell et al. | 361/681 |
| 5,196,993 | 3/1993 | Herron et al. | 361/681 |
| 5,241,303 | 8/1993 | Register et al. | 345/168 |
| 5,268,816 | 12/1993 | Abell, Jr. et al. | 361/681 |
| 5,276,589 | 1/1994 | Bartlett et al. | 361/681 |
| 5,283,862 | 2/1994 | Lund | 395/155 |

FOREIGN PATENT DOCUMENTS

| | | | |
|---|---|---|---|
| 454120 | 10/1991 | European Pat. Off. | G06F 1/16 |
| 4-218820 | 8/1992 | Japan | G06F 1/16 |

OTHER PUBLICATIONS

IBM–ThinkPad 750 sell sheet.
Toshiba T4700C Series advertisement, *Fortune*, May 16, 1994.
"Motorola's Envoy Brings New Message on PDA Design", *Computer Shopper*, Jun. 1994, p. 61.
GRiDPAD Technical Specifications sell sheet, 1989.
"The New Workplace [Sharp Pocketsize Touch Screen Wizard OZ–9500]", *Mobile Office*, May 1994.
"66mhz 486DX2 Color PCMCIA Notebook Computer" Avanti advertisement, *JDR Microdevices*, 1994 Catalog #36, p. 56.
"The New NEC Color Versa E Series" advertisement, *Tiger-Software*, vol. IV., No. 4.
"The Zeos' Freestyle . . . The Flexible System for Your Every Problem" advertisement, *PC Magazine*, May 17, 1994, vol. 13, No. 9.

*Primary Examiner*—Michael W. Phillips
*Attorney, Agent, or Firm*—Renner, Kenner, Greive, Bobak, Taylor & Weber

[57] ABSTRACT

A laptop style computing device (10) includes a base portion (11), a display portion (12) containing a display screen (16) and a touch input panel (18) and a mechanism (45, 55) for selectively positioning the display portion in selective angular engagement with the base portion in a plurality of angular upright positions for use in the laptop mode, as well as the display up position for slate style use and the display down position for closing the device.

6 Claims, 7 Drawing Sheets

PORTABLE COMPUTING DEVICE HAVING AN ADJUSTABLE HINGE

TECHNICAL FIELD

This invention relates to laptop computers and related computing devices which feature a base, providing a keyboard or keypad, and a movable cover which houses a display screen of a conventional type. More particularly, the present invention provides novel hinge mechanisms that allow the cover to be selectively movable with respect to the base between closed and opened positions. Unlike existing devices however, the cover can be slidably and selectively positioned along the base and can be fully inverted onto the base for slate style use.

BACKGROUND OF THE INVENTION

In recent years, the popularity of laptop and notebook style portable computers has continued to increase. At the same time computer manufacturers have responded to consumer demands for more practical and convenient designs by making such computers more powerful, more compact and more lightweight. Thus it has been desired to design such computers which include many if not all of the features of conventional desktop computer systems in a versatile lightweight package which claims very little space. This goal has been facilitated by the advances in semiconductor technology and liquid crystal display (LCD) technology. A common configuration for laptop computers is to house hardware components such as the CPU motherboard, hard drive, floppy drives, as well as the keyboard and battery power supply within a main case portion. A LCD screen is housed within a cover member which is hingedly affixed to the case portion. The LCD screen typically interfaces with the CPU by way of a flexible ribbon cable so as to permit the cover member to pivot relative to the main case so that the case may be closed or positioned such that the LCD may be viewed by the user.

This common configuration has drawbacks which many users find annoying, for instance, the LCD/cover member may for all practical purposes be placed in only two positions—open and closed. While some units include hinges having a friction component sufficient to maintain the LCD in varying angular positions relative to the case portion, the range of adjustable angles is very limited. Further, it has been found that the rather high profile that results when the LCD/cover is in the open or in-use position, is of such a nature as to make it difficult to use the computer unit in cramped confines such as in automobiles or in aircraft. Attempts to overcome this problem have included hinge designs which permit positioning of the display screen in a wide variety of angles relative to the case. Other designs include swivel devices which permit angular positioning of the display screen relative to the case on multiple axes.

A relatively recent trend in portable computer design has been the use of stylus or pen-based input devices. Typically, a touch panel, or pen-input panel is used in conjunction with a conventional LCD, thereby allowing users to input data or select functions by simply touching the panel or by using a specially designed stylus. These pen-based units are commonly referred to as slate-style computers because the display typically does not pivot relative to the case as in notebook style computers. Such slate style computers are preferred by many users due to the small amount of space claimed by the unit as well as the ease of inputting data.

However, many users find the lack of a keyboard for input to be a disadvantage. In response to this some manufacturers have attempted to compromise by designing units having both keyboard and pen-based input capabilities. Nevertheless, such compromises have fallen short of satisfying the consumer, due to the difficulty in using such devices. For example, some designs simply allow an external keyboard to be connected to a slate-style unit, such two-piece designs are not conveniently ported. Other designs have included small nonstandard keyboards in conjunction with pen-based input, this also has proved to be inconvenient. Yet another design provides a display screen which is detachable from the base portion and capable of being reattached in the upright (notebook) position, the slate position, or reversed to close the unit. Again the two-piece design makes such devices cumbersome to change from one position to another.

It can thus be seen that there is a need for a portable computer which combines all of the features of both notebook style and slate style devices in a single, lightweight, compact unit, wherein the display/cover member is capable of being positioned in a wide variety of angles while integrated with the main case portion.

SUMMARY OF INVENTION

It is therefore, an object of the present invention to provide a portable computer having a lightweight, compact design.

It is another object of the present invention to provide such a computer which includes both keyboard and pen-based input capabilities, in conjunction with a liquid crystal or other appropriate display screen.

It is a further object of the present invention to provide such a computer wherein the display may be selectively positioned in a variety of angular positions relative to the main unit so as to permit operation of the unit in laptop, keyboard mode or slate style pen-based mode.

It is a still further object of the present invention to provide such a computer wherein the display and touch panel may be inverted so as to provide a cover for the unit.

In general, an improved laptop style computing device comprises a base portion, a display portion containing a display screen and a touch input panel and, means for selectively positioning the display portion in selective angular engagement with the base portion in a plurality of angular upright positions for use in the laptop mode, as well as the display up position for slate style use and the display down position for closing the device.

At least one or more of the foregoing objects, together with the advantages thereof over the known art relating to hinge mechanisms for laptop computer devices, which shall become apparent from the specification which follows, are accomplished by the invention as hereinafter described and claimed.

PREFERRED EMBODIMENT FOR CARRYING OUT THE INVENTION

Figure 1:
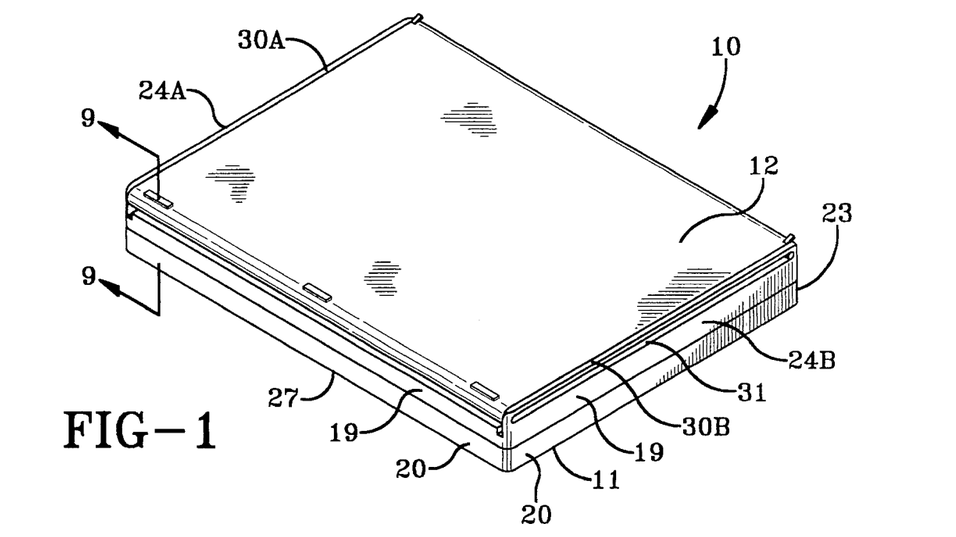
FIG. 1 is a perspective view of the first embodiment of the present invention with the lid/display in the closed position.
Figure 2:
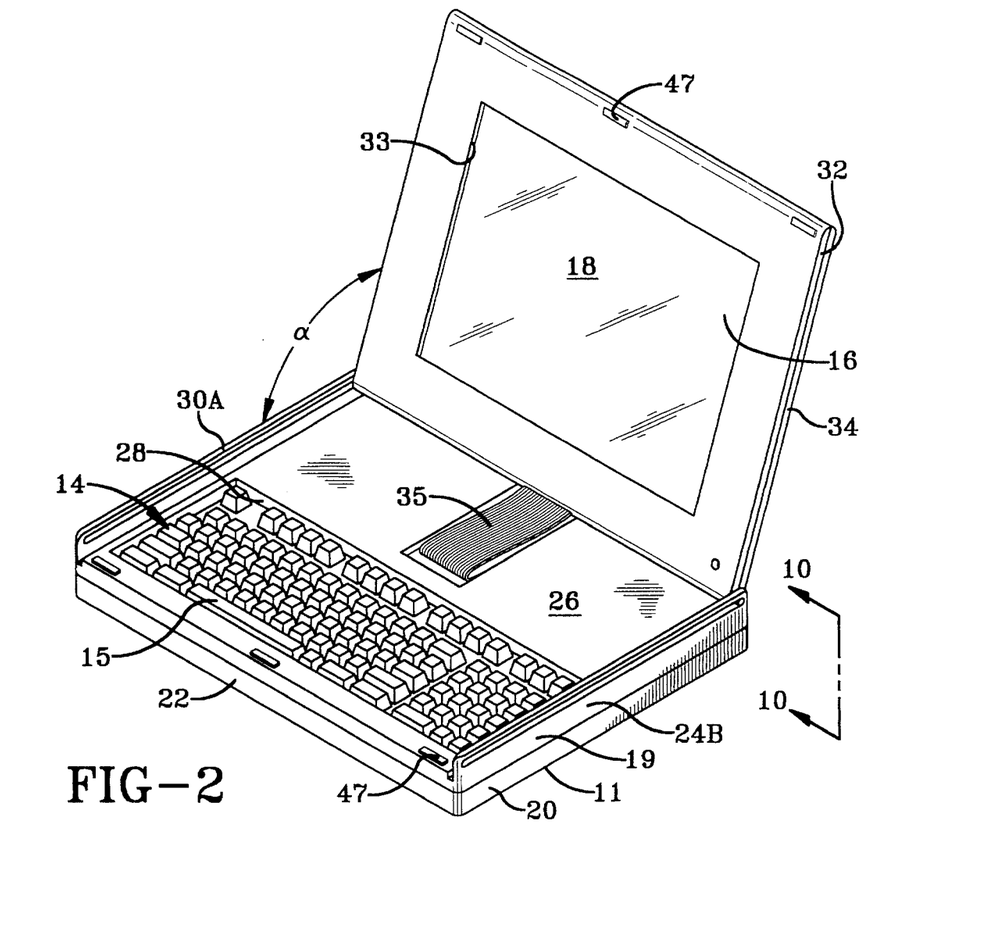
FIG. 2 is a view similar to FIG. 1 but depicting the lid/display in the upright or laptop position.
Figure 3:
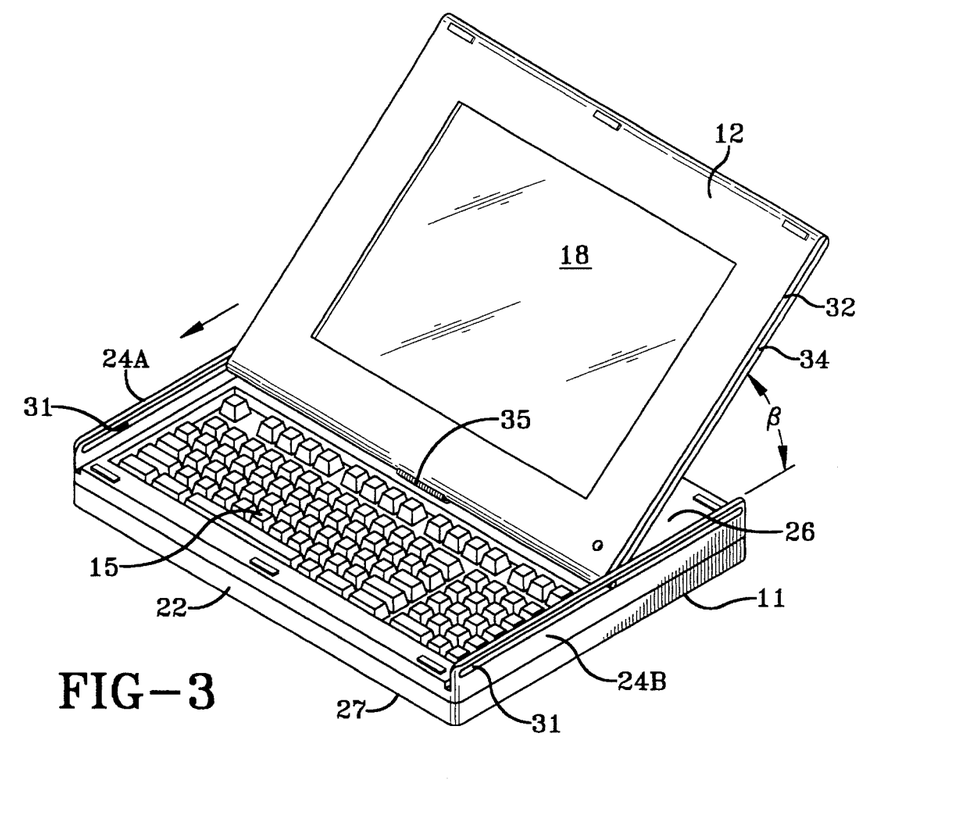
FIG. 3 is a view similar to FIGS. 1 and 2 but depicting the lid/display in a low profile angle of adjustment.
Figure 4:
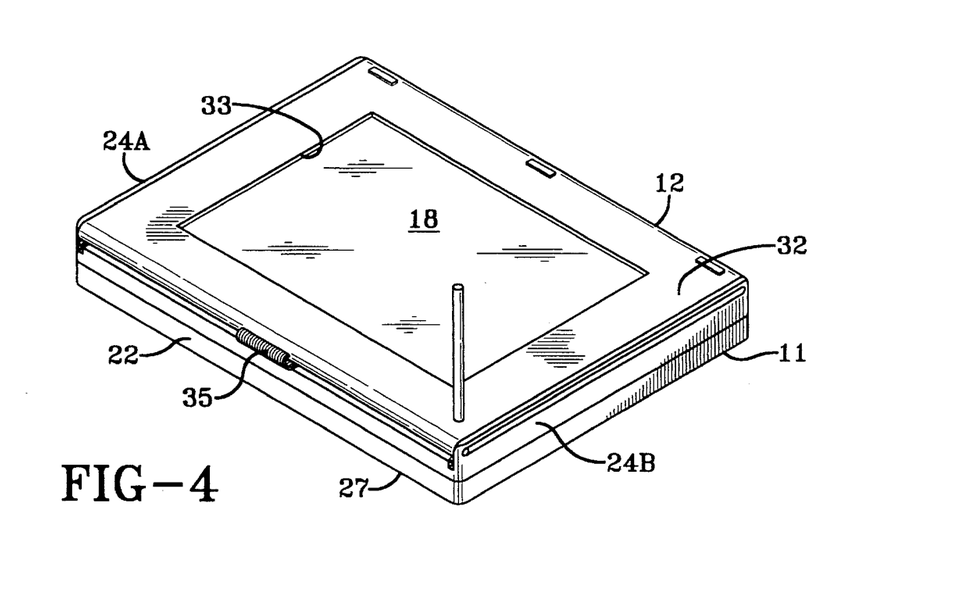
FIGS. 4 is a view similar to FIGS. 1–3 but depicting the lid/display in the slate style position.

One embodiment of a portable computing device according to the concept of the present invention is designated generally by the numeral 10 on the accompanying drawings. As is best shown in FIGS. 2 and 3 the device 10 generally comprises a base unit 11 and a cover 12 which houses the display, hereinafter referred to alternatively as the cover or the display cover. Those skilled in the art will recognize that the base unit 11 may house a number of conventional portable computer components such as the requisite circuit boards, data storage components and power supply (none of which are shown). It should further be recognized that the base unit 11 may house a conventional laptop-style keyboard unit 14 having a plurality of standard size data input keys 15. The cover 12 houses a conventional liquid crystal or other appropriate display screen 16 in combination with a conventional touch panel 18.

With particular reference to FIG. 1–4 it can be seen that the base unit 11 is of a generally rectangular shape. More particularly it is contemplated that the base unit 11 may be molded from an appropriate thermoplastic or other suitable material and as such would comprise an upper panel 19 and a lower panel 20 which when fitted together form a generally box shaped housing having a front wall 22, and a back wall 23 a pair of opposed end walls 24A and 24B as well as a top surface 26 and a bottom surface 27. Those skilled in the art will recognize that the panels 19, 20 and 23 may include an appropriate number of apertures or access panels (not shown) for providing access to internally housed components. In particular, it can be seen that the upper panel 19 includes a recessed area 28 in which the keys 15 are arrayed. For reasons which will become apparent as the description continues the upper panel 19 further includes a pair of opposed rails 30A and 30B which extend orthogonally from the top surface 26 along the length of each of the opposed end walls 24. Each rail 30 defines a slotted aperture 31 which runs substantially the entire length of the end walls 24.

With respect now to the cover for the display 12 it is contemplated that the cover 12 will be of a box-like shape having a rather thin profile. The display cover 12 may be molded from an appropriate thermoplastic or other suitable material in a two panel housing configuration as with the base 11. Accordingly, a first panel 32 is provided having a large rectangular aperture 33 which allows access to the display screen 16 and the touch panel 18. The first panel 32 matingly engages a second panel 34 to form a housing for the display screen 16 and touch panel 18. A flexible folded ribbon cable 35 provides the needed electronic connection between the base unit 11 and the display screen 16 and the touch panel 18.

Figure 9:
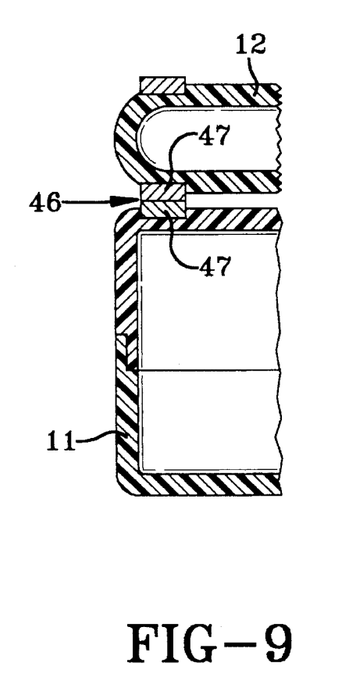
FIG. 9 is a broken cross-section of the latch of the present invention taken along line 9—9 of FIG. 1.
Figure 10:
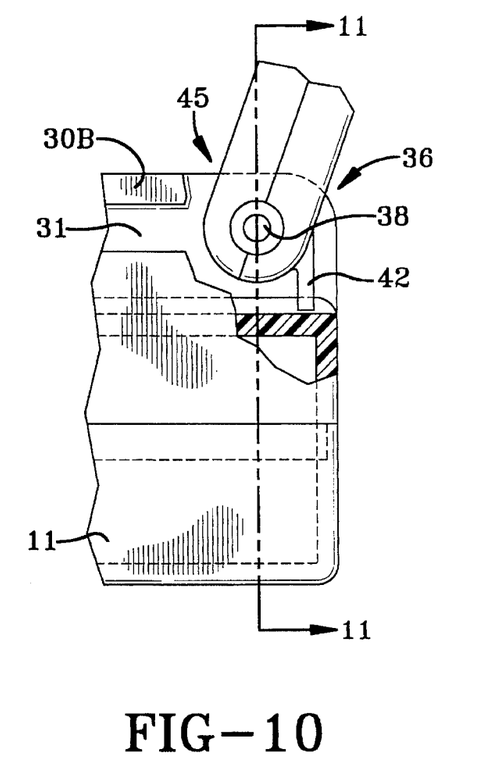
FIG. 10 is a broken view, partially in section, of the hinge mechanism taken along the line 10—10 of FIG. 2.
Figure 11:
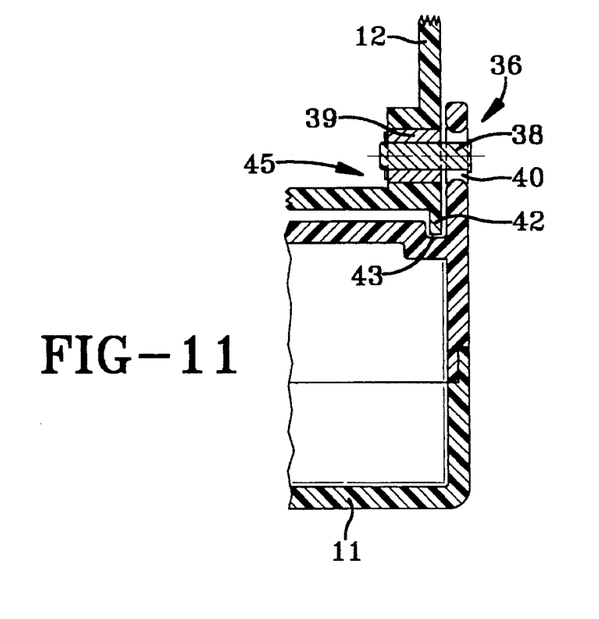
FIG. 11 is a cross sectional view of the hinge mechanism of FIG. 10 taken along the line 11—11 of FIG. 10.
Figure 12:
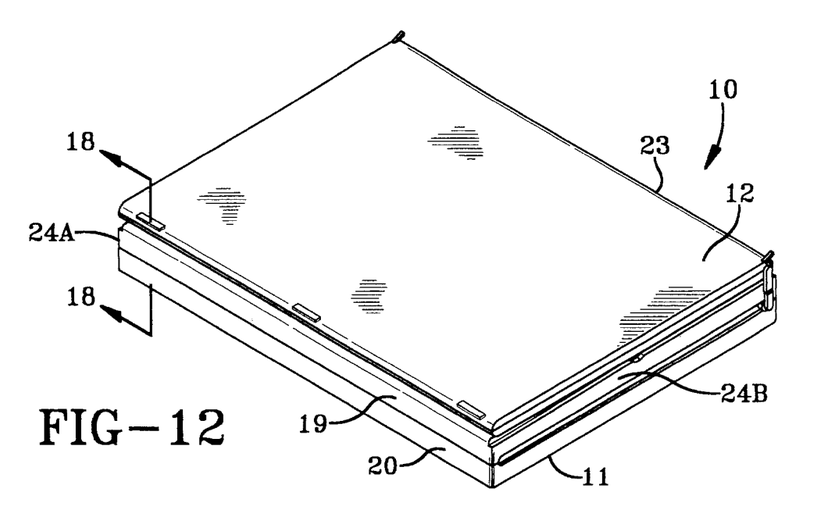
FIG. 12 is a view similar to FIG. 1 but depicting a second embodiment.
Figure 13:
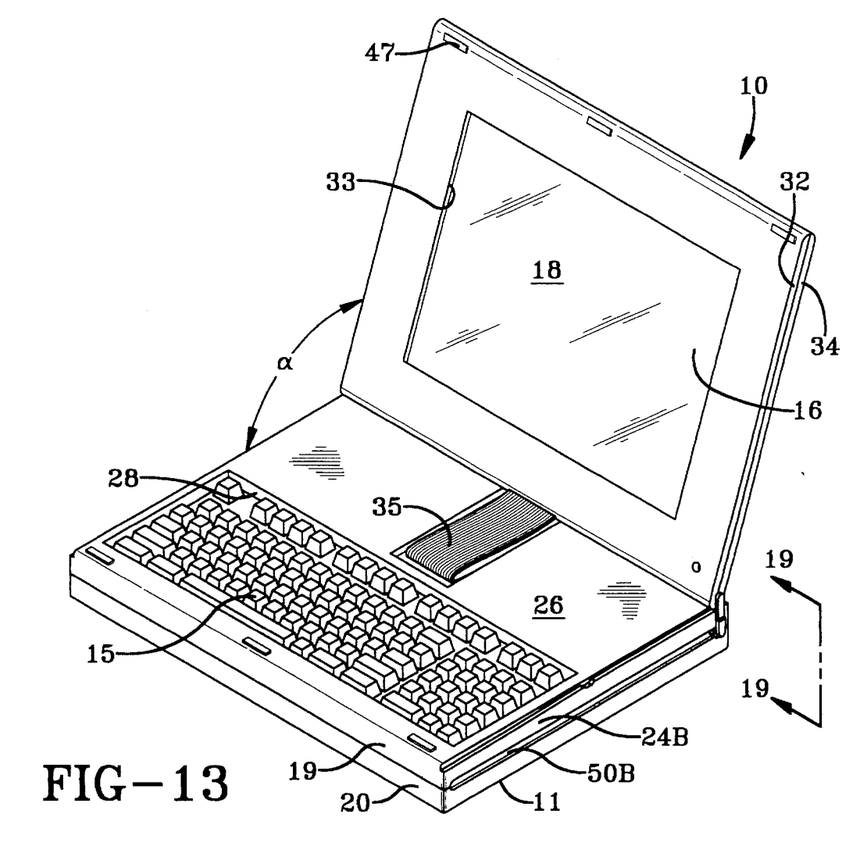
FIG. 13 is a view similar to FIG. 2 but depicting a second embodiment.
Figures 14, 15:
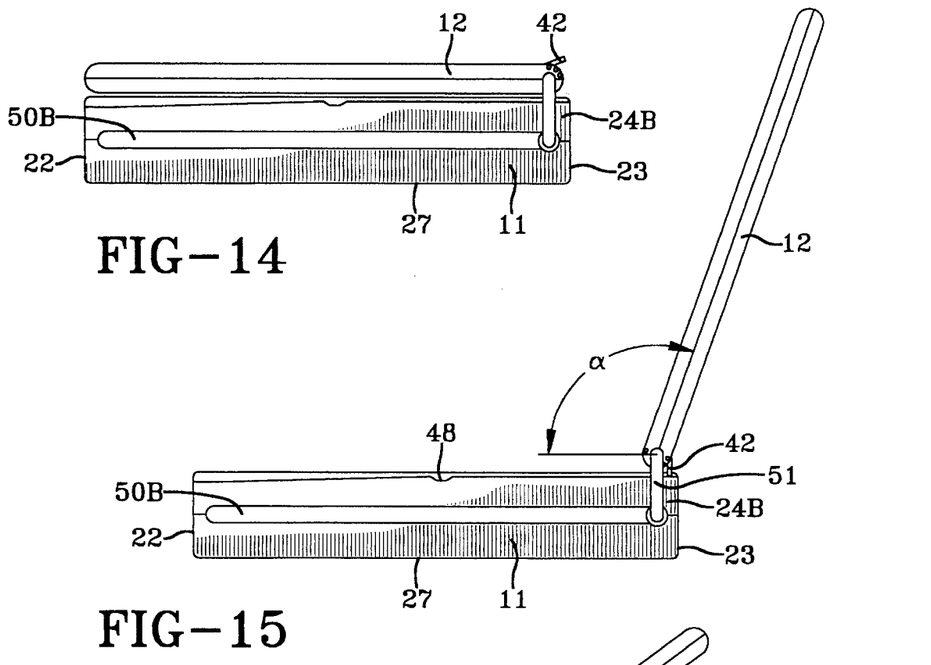
FIG. 14 is a side elevation of the second embodiment with the lid/display positioned as in FIG. 12.
FIG. 15 is a side elevation of the second embodiment with the lid/display positioned as in FIG. 13.
Figure 16:
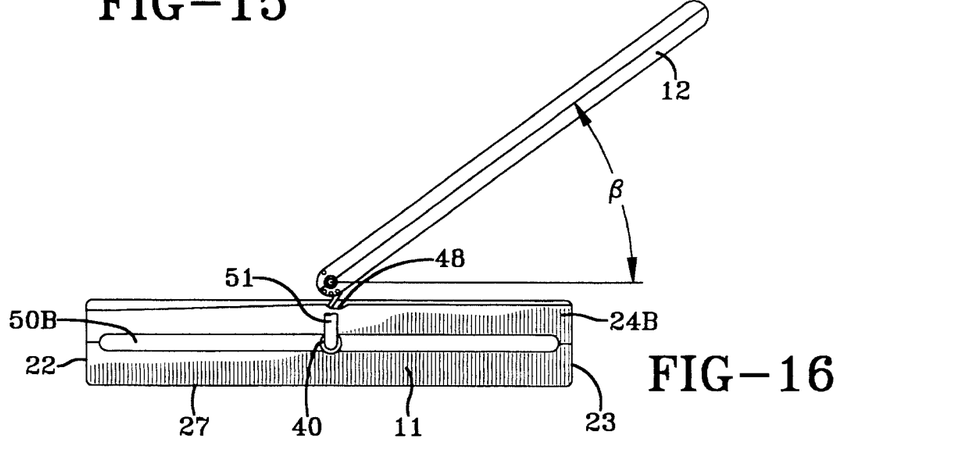
FIG. 16 is a side elevation of the second embodiment with the lid/display positioned as in FIG. 7.
Figure 17:
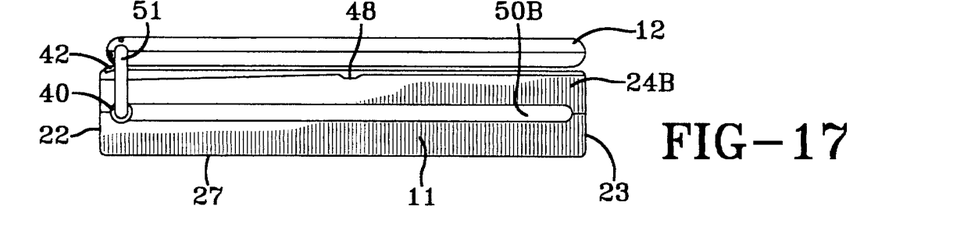
FIG. 17 is a side elevation of the second embodiment with the lid/display positioned as in FIG. 8.
Figure 18:
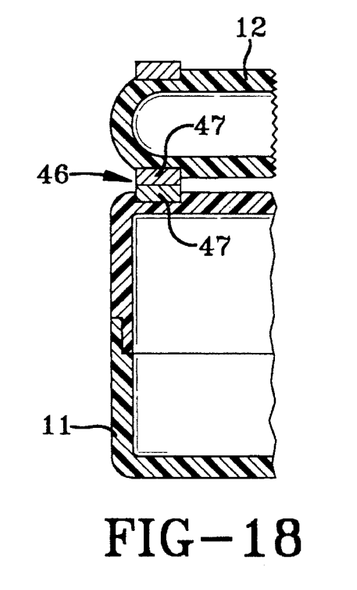
FIG. 18 is a broken cross-section of the latch of a second embodiment of the present invention taken along line 18—18 of FIG. 12.
Figure 19:
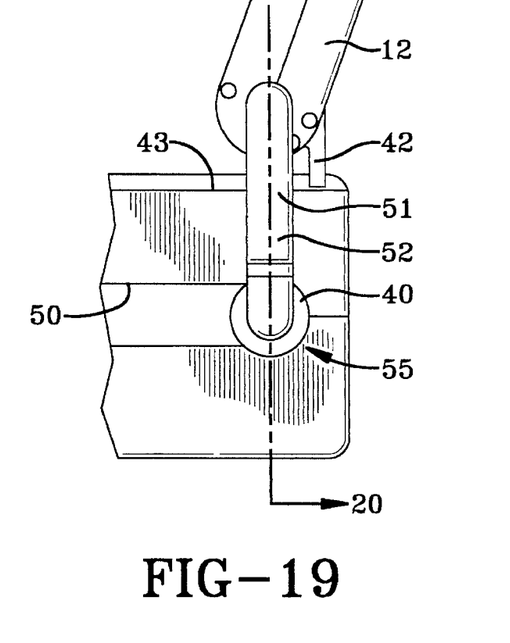
FIG. 19 is a broken view of the hinge mechanism of a second embodiment of the present invention taken along line 19—19 of FIG. 13.
Figure 20:
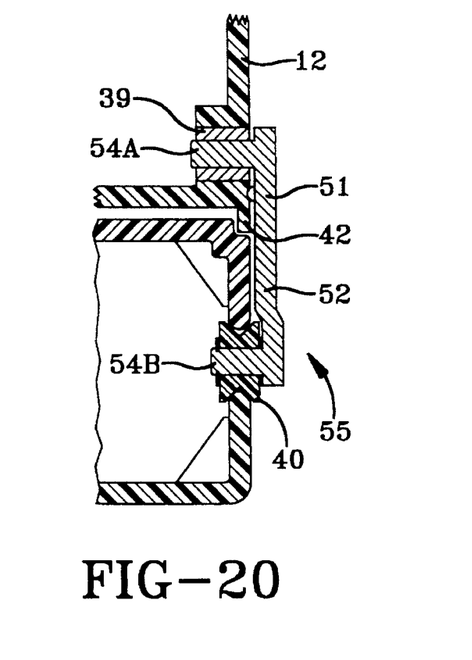
FIG. 20 is a cross sectional view of the hinge mechanism of FIG. 19 taken along line 20—20 of FIG. 19.

Referring now to FIGS. 10 and 11 a hinge mechanism, generally 36, is provided as a pivotal linkage between the base unit 11 and the display cover 12. As shown, the hinge mechanism 36 comprises a hinge pin 38 which is journaled in the display cover 12 by way of an appropriate anti-friction bearing 39 such as a conventional nylon sleeve bearing or the like. The hinge pin 38 extends outwardly from the cover 12 and is fitted on one end with a roller 40. It can be seen that the roller 40 rides in the slotted aperture 31 formed by the rails 30 of the base unit 11. A hinge mechanism 36 is included on both sides of the display cover 12 thereby maintaining the cover 12 in sliding pivotal engagement with the base 11. As is best seen in FIG. 5–11 the display cover 12 further includes a pair of angularly disposed support tabs 42 which extend outwardly from the cover 12 adjacent to the hinge mechanism 36. The support tabs 42 act as a stop to maintain the display cover 12 in an upward position relative to the base 11. A pair of grooves 43 are provided in the base 11 in which the support tabs 42 are disposed. The grooves 43 are molded in the base 11 so that the depth of the grooves 43 increase gradually from rear to front, that is to say, the groove is shallowest at the rearmost point and is deepest at the front most point so as to form an inclined bottom surface. The rails 30, slot apertures 31 and hinge pins 38 function together to provide the means for selectively positioning the display relative to the base, indicated generally by the numeral 45.

Figures 5, 6, 7:
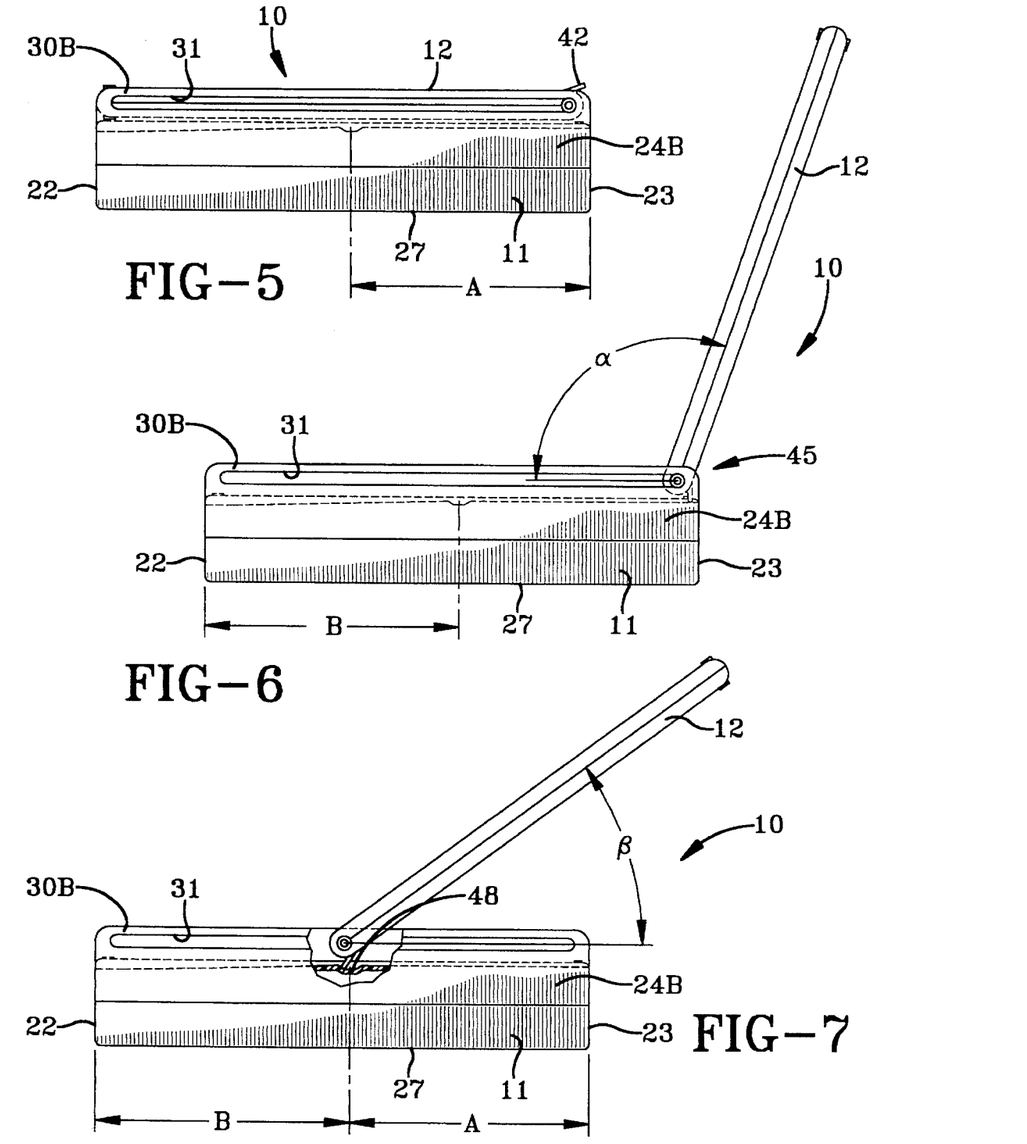
FIG. 5 is a side elevation of the present invention with the lid/display positioned as in FIG. 1.
FIG. 6 is a side elevation of the present invention with the lid/display positioned as in FIG. 2.
FIG. 7 is a side elevation of the present invention with the lid/display positioned as in FIG. 3.
Figure 8:
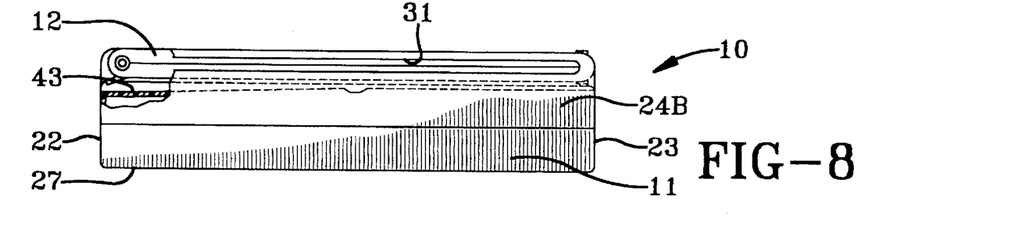
FIG. 8 is a side elevation of the present invention with the lid/display positioned as in FIG. 4.

Those skilled in the art should now recognize that the display cover 12 may pivot downwardly into the fully closed position as shown in FIG. 5 and upwardly into the fully upright or laptop position as shown in FIG. 6. As is apparent from the drawings, the support tabs 42 maintain the cover 12 at an angle no greater than in the range of 90 to 110 degrees. It should further be apparent that the display cover 12 may be pivoted slightly forward and slidingly manipulated forward in the channels 31 so as to allow selective positioning of the display cover 12 at any point in the region designated as A in the drawings. Accordingly, the varying depth of the grooves 43 permits the display angle (alpha) to increase proportionately to the distance by which the display cover 12 is slid forward in the channels 31. Thus, the display may be adjusted to a variety of angular positions which the user may find comfortable. As the display is moved forward for use in cramped quarters, it is also lowered, toward the horizontal position, which assists the user to view and read the display.

It should be apparent that as the display is moved forward in the channels 31 into the region designated as B in the drawings, the depth of the grooves 43 becomes sufficiently great that the support tabs 42 no longer contact the inclined bottom surface. As such the display cover 12 is pivoted in the channel a full 180 degrees relative to the base from the fully closed position shown in FIG. 1 and 5 to the slate-style position shown in FIGS. 4 and 8. The user may thus utilize the device 10 in the slate-style or pen-based mode. It should be recognized that the ribbon cable 35 flexes and folds throughout the full range of angular positions. It should further be noted that rollers 40 in conjunction with the channels 31 allow smooth pivotal and sliding movement within the full range of positions without binding.

With reference to FIGS. 1–9 and particularly FIG. 9 it will be noted that the device 10 may be provided with an appropriate latch means 46 for maintaining the display case in secure engagement with the base 11 when in the fully closed position and the slate style position. It is contemplated that the latch means 46 may comprise a pair of opposed magnetic plates 47 mounted in the display cover 12 and the base 11 in corresponding positions so as to complement one another when closed or in the slate style mode. However, it is recognized that the latch 46 may be comprised of any number of appropriate engagement means for engaging two elements without departing from the spirit of the invention. It is further contemplated that the device 10 may include a pair of stop notches 48 in the grooves 43 at the transition point between regions A and B. Accordingly, the display may be quickly positioned by the user in the low profile laptop position depicted in FIG. 7. However, the notches 48 are not necessary to the operation of the device but may be included merely to facilitate quick positioning of the display.

Referring now to FIGS. 12–20 an alternative embodiment of the device 10 is depicted. The alternative embodiment differs from the first embodiment only in the hinge mechanism. As is apparent from the drawings, the rails 30 and channels 31 of the first embodiment are omitted in favor of channels 50A, 50B which are included in the end walls 24 of the base 11. The hinge pins of the first embodiment are similarly omitted in favor of a pair of hinge arms 51. Each arm 51 comprises an oblong main body portion 52 having pivot pins 54A and 54B extending orthogonally from each of its ends. A first pivot pin 54A engages the anti-friction bearing 39 fitted within the display cover 12 while a second pivot pin 54B engages the roller 40 which is fitted within the channel 50. The channels 50 and hinge arms 51 function together to provide the means for selectively positioning the display relative to the base, indicated generally by the numeral 55. Those skilled in the art should now recognize that positioning of the display cover 12 relative to the base 11 is accomplished as described above, in connection with the description of the first embodiment.

Thus a portable computing device is provided which permits operation in both the laptop and slate style modes, permitting a high degree of adjustability and compactness without giving up the other features desired in laptop and slate style computing devices. Accordingly, it is submitted that the device described herein accomplishes the objects of the invention and otherwise improves the art. While two preferred embodiments have been described in detail, such embodiments are to be considered as illustrative rather than limiting.

Based upon the foregoing disclosure, it should now be apparent that the use of the means for selectively positioning the display portion of a laptop computing device with respect to the mating base, as described herein, will carry out the objects set forth hereinabove. It is, therefore, to be understood that any variations evident fall within the scope of the claimed invention and thus, the selection of specific component elements can be determined without departing from the spirit of the invention herein disclosed and described. In particular, practice according to the present invention is not necessarily limited to laptop computers per se, but can be applied to a variety of related computer-like devices having a movable cover. Moreover, as noted hereinabove, other hinge means may be substituted for the hinge mechanisms disclosed herein. Thus, the scope of the invention shall include all modifications and variations that may fall within the scope of the attached claims.

What is claimed is:

1. An improved portable computing device comprising:

a base portion;

a display portion containing a display screen and a touch input panel;

at least one channel disposed within said base portion;

at least one roller disposed within said channel; and hinge pin means engaging said roller and said display portion whereby said display portion is slidably pivoted relative to said base portion;

at least one inclined groove disposed within said base portion;

at least one support tab extending from said display portion into said inclined groove to support said display portion at varying angles relative to said base position;

said channel and said inclined groove are carried within an end wall of said base, said channel being above said groove;

a second channel disposed within said base portion, opposite said first channel;

a roller disposed within said second channel;

hinge pins means engaging said roller within said second channel and said display portion whereby said display portion is slidably pivoted relative to said base portion;

a second inclined groove disposed within said base portion, opposite said first groove; and a second support tab extending from said display portion into said second inclined groove to support said display portion at varying angles relative to said base position.

2. An improved portable computing device as set forth in claim 1, wherein said second channel and said second inclined groove are carried within an end wall of said base, said channel being above said groove.

3. An improved portable computing device comprising:

a base portion;

a display portion containing a display screen and a touch input panel;

at least one channel disposed within said base portion;

hinge arm means providing first and second hinge pins, said first hinge pin being engageable with said channel and said second hinge pin being engaging with said display portion whereby said display portion is slidably pivoted relative to said base portion;

at least one inclined groove disposed within said base portion; and at least one support tab extending from said display portion into said inclined groove to support said display portion at varying angles relative to said base position.

4. An improved portable computing device as set forth in claim 3, wherein said channel and said inclined groove are carried within an end wall of said base, said channel being below said groove.

5. An improved portable computing device as set forth in claim 4, further comprising a second channel disposed within said base portion, opposite said first channel; and second hinge arm means providing first and second hinge pins, said first hinge pin being engageable with said second channel and said second hinge pin being engaging with said display portion whereby said display portion is slidably pivoted relative to said base portion.

6. An improved portable computing device as set forth in claim 5, further comprising first and second bearing means movable within said first and second channels, respectively and engageable with said first hinge pins, respectively.

* * * * *